United States Patent
Dudar et al.

(10) Patent No.: US 10,112,582 B2
(45) Date of Patent: Oct. 30, 2018

(54) WINDSHIELD CLEANING SYSTEM AND METHOD

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/265,606

(22) Filed: Sep. 14, 2016

(65) Prior Publication Data
US 2018/0072272 A1 Mar. 15, 2018

(51) Int. Cl.
| B60S 1/08 | (2006.01) |
| B60R 11/04 | (2006.01) |
| H04N 7/18 | (2006.01) |
| B60R 11/00 | (2006.01) |
| B60S 1/48 | (2006.01) |

(52) U.S. Cl.
CPC ............ B60S 1/0844 (2013.01); B60R 11/04 (2013.01); B60S 1/0833 (2013.01); H04N 7/183 (2013.01); B60R 2011/0026 (2013.01); B60S 1/488 (2013.01)

(58) Field of Classification Search
CPC .. B60S 1/0844; B60R 11/04; B60R 2011/026; H04N 7/183; Y10S 318/02
See application file for complete search history.

(56) References Cited

U.S. PATENT DOCUMENTS

| 5,990,647 A * | 11/1999 | Zettler ................ B60S 15/2501 15/250.1 |
| 9,250,067 B2 | 2/2016 | Addington |
| 2004/0178760 A1* | 9/2004 | Kobayashi ............ B60S 1/0822 318/483 |
| 2007/0227718 A1 | 10/2007 | Hill et al. |
| 2013/0275007 A1* | 10/2013 | Chen ..................... B60S 1/0833 701/49 |

(Continued)

FOREIGN PATENT DOCUMENTS

| CN | 202413712 U | 9/2012 |
| DE | 102009051263 A1 | 9/2010 |

(Continued)

OTHER PUBLICATIONS

Search Report from United Kingdom Intellectual Property Office dated Feb. 9, 2018 regarding GB Application No. GB1714677.0 (4 pages).

Primary Examiner — Katelyn B Whatley
(74) Attorney, Agent, or Firm — Frank A. MacKenzie; Bejin Bieneman PLC (57) ABSTRACT

Disclosed herein is a windshield cleaning system including a computer in electronic communication with a windshield wiper controller, an image device, a fluid applicator, and a fluid heater. The system captures and compares a pre-spray image with a post-spray image, the post spray image acquired after actuating the fluid applicator and before actuating the windshield wiper. The comparison is performed by the computer to determined potential conditions with the windshield cleaning system.

19 Claims, 6 Drawing Sheets

(56) References Cited

U.S. PATENT DOCUMENTS

2014/0270391 A1* 9/2014 Addington .......... G01B 11/303
                                                   382/108
2015/0088374 A1* 3/2015 Yopp ................ B60H 1/00785
                                                   701/36

FOREIGN PATENT DOCUMENTS

GB        2471674 A    1/2011
JP      200755562 A    8/2007

* cited by examiner

WINDSHIELD CLEANING SYSTEM AND METHOD

BACKGROUND

Various windshield cleaning systems for vehicles are known. Such systems typically utilize mechanical wiper blade assemblies that physically wipe material from a windshield. Windshield cleaning systems also typically utilize a fluid spray system to spray liquid on the windshield to enhance the cleaning process. More recently, cleaning systems have included heaters of various design to heat the liquid sprayed on the windshield. As windshield cleaning systems become more advanced, and vehicles become more automated, enhanced windshield cleaning systems and methods are desired.

DESCRIPTION

Introduction

The disclosed windshield monitoring and cleaning system 20 (see FIGS. 1 and 2) addresses the problem that in a computer-operated vehicle 25 it may be difficult to determine whether vehicle 25 windshield 23 cleaning mechanisms are operating properly. Accordingly, a vehicle 25 computer 30 is programmed to capture a first image before a windshield 23 is sprayed with a heated cleaning fluid 65, and a second image after the windshield 23 is sprayed with the heated cleaning fluid 65. The first and second images in one example are conventional visual images captured by one or more conventional cameras that capture and record light in the visible spectrum to generate images as is known. Alternatively, or additionally, the first and second images in another example are generated by infrared light sensors that capture images in the infrared spectrum. In either event, a comparison of first and second images (sometimes referred to as "pre" and "post" images, respectively) allows for diagnosis of one or more potential windshield cleaning conditions of the windshield monitoring and cleaning system 20 (referred to herein for convenience as the "windshield system 20" or the "windshield cleaning system 20"). Based on the diagnosis, the computer 20 can actuate one or more remediation mechanisms in the vehicle 25, such as a heater to reduce and/or eliminate ice that could be clogging nozzle(s) 63 that spray fluid 65 on the windshield 23, application of additional cleaning fluid 65, applying a defroster 80 or the like to the windshield 23, etc.

System

Figure 1:
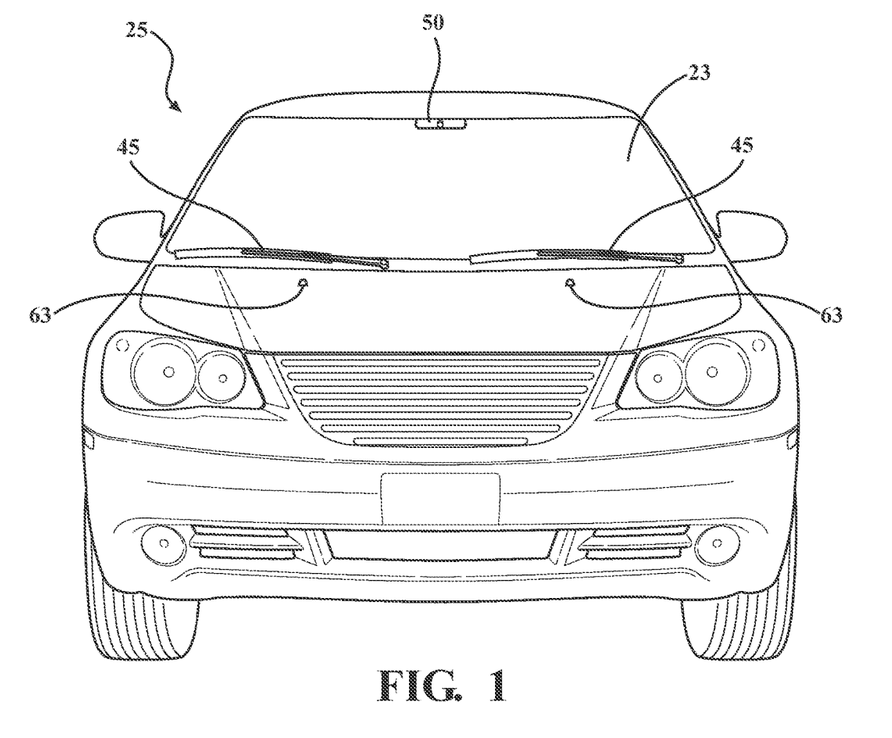
FIG. 1 is a perspective view of a vehicle with an example windshield cleaning system.
Figure 2:
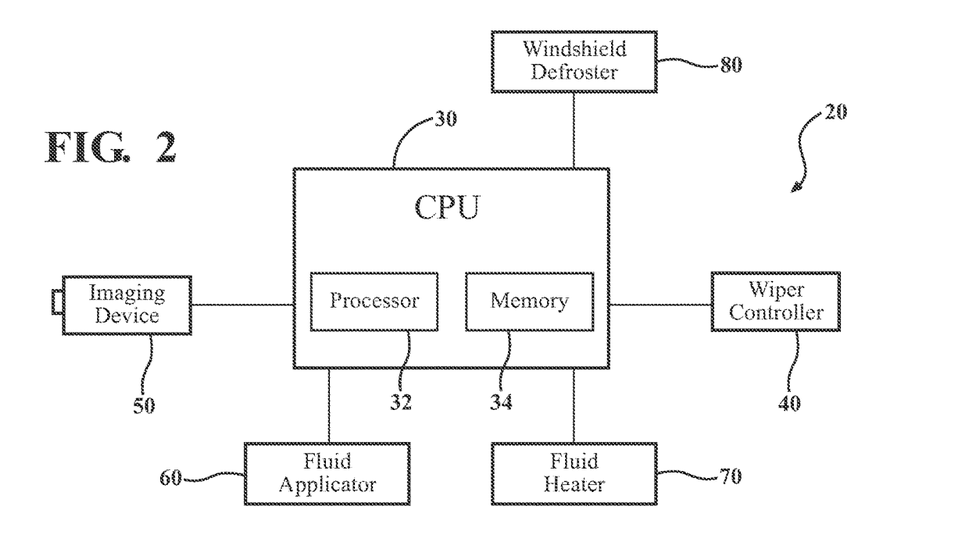
FIG. 2 is a block diagram of components of the example windshield cleaning system of FIG. 1.

As shown in FIGS. 1 and 2, a windshield cleaning and monitoring system 20 for cleaning a windshield 23 of a vehicle 25 includes a computer 30, an electronic windshield wiper controller 40 and wipers 45, one or more imaging devices 50, a windshield fluid applicator 60, and a fluid heater 70.

The computer 30 is a computing device that includes a processor 32 and a memory 34.

The processor 32 is implemented via circuits, chips, or other electronic components and may include one or more microcontrollers, one or more field programmable gate arrays (FPGAs), one or more application specific circuits ASICs), one or more digital signal processors (DSPs), one or more customer integrated circuits, etc. The processor can receive the data from sensors and memory. The processor 32 is programmable to process the sensor data. Processing the data may include processing the video and/or still image feed and/or other data stream captured by the sensors to determine the issues with the windshield cleaning system 20. As described below, the processor instructs vehicle components to actuate in accordance with the sensor data. The processor may be incorporated into a controller, e.g., an autonomous mode controller.

The memory 34 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The computer 30 is in electronic communication with one or more conventional and known (and therefore not shown in the drawings) input devices for providing data to the computer 30 and one or more output devices for receiving data and/or instructions, e.g., to actuate an output device, from the computer 30. Exemplary input devices include: human interfaces such as a switch or graphical user interface (GUI); imaging devices 50 such as LiDAR, still and/or video cameras, infrared sensors, etc as well as other sensors and/or electronic control units (ECUs) that are known to provide data, e.g., on a vehicle 25 communications bus or network, such as, radar, ultrasonic sensors, accelerometers, gyroscopes, pressure sensors, thermometers, barometers, altimeters, current sensing devices, voltage sensing devices, microphones, light sensors, etc. etc. Exemplary output that may be actuated by the computer 30 devices include: warning light and audible subsystems; GUIs; human machine interface (HMIs), communication devices having Bluetooth, Wi-Fi or cellular capabilities; other computers; a fluid applicator 60, a fluid heater 70, and/or a windshield defroster 80 etc.

HMIs present information to and receives information from an occupant of the vehicle. The HMI interface may be located, e.g., on an instrument panel in a passenger cabin of the vehicle, or wherever may be readily seen by the occupant. The HMI may include dials, digital readouts, screens, speakers, and so on for providing information to the occupant. The HMI may include buttons, knobs, keypads, microphone, and so on for receiving information from the occupant.

The electronic windshield wiper controller 40 is in electronic communication with the computer 30. The wiper controller 40 communicates with an actuator such as is known to move the wipers 45. The wipers 45 can be moved to clear the windshield 23, e.g., of precipitation, moisture, fluids 65, etc.

Each of the one or more imaging devices 50 is in electronic communication with the computer 30 in a known manner. Imaging devices 50 can include one or more of a digital (still and/or video) camera, LiDAR, infrared light detector, and/or other sensor. As is known, LIDAR is a technique for transmitting scanned light pulses, which can be from a laser, for example, and measuring the time of flight of the pulses to determine 3D range or distance to points in the surrounding real world. Further as is known, a camera can capture two-dimensional digital images comprised of pixels. Yet further, infrared sensors are known for detecting light in the infrared spectrum. In general, the image device 50 captures conventional images in the visible light spectrum, and/or captures images outside of the visual spectrum, for example an infrared image showing detected temperatures. The captured images are converted to electronic information to be transmitted and stored in the memory 34 of the computer 30, e.g., as a file.

Windshield fluid applicator 60 includes components known for delivering fluid 65 to the surface of the windshield 23, including one or more nozzles 63, a fluid reservoir and a fluid pump. The windshield fluid applicator 60 includes an electronic controller such as is known in electronic communication with the computer 30. The nozzles 63, a fluid reservoir and a fluid pump (known components not shown in the drawings for ease of illustration) are in fluid communication such that the windshield fluid applicator 60 actuates to pump fluid 65 from the fluid reservoir through the nozzles 63 towards the windshield 23.

The fluid heater 70 may be disposed within the fluid reservoir, or located in-line with the fluid flow from the reservoir to the nozzles of the windshield fluid applicator 60. The fluid heater 70 is actuated by an electronic controller such as is known in electronic communication with the computer 30, e.g. via a vehicle 25 communication bus or the like. The fluid heater 70 actuates to heat the fluid 65 in the windshield fluid applicator 60 before the fluid 65 is sprayed from the nozzle 63.

The windshield defroster 80 is known for directing (typically hot) air toward an interior surface of the windshield 23. Alternatively, or additionally, the defroster 80 can, as is known, include heating elements such as wires or the like embedded in the windshield 23. In any event, the defroster 80 can be actuated by an electronic controller such as is known, which can further be in electronic communication, e.g. via a vehicle 25 communications bus, with the computer 30.

Process

Figure 3:
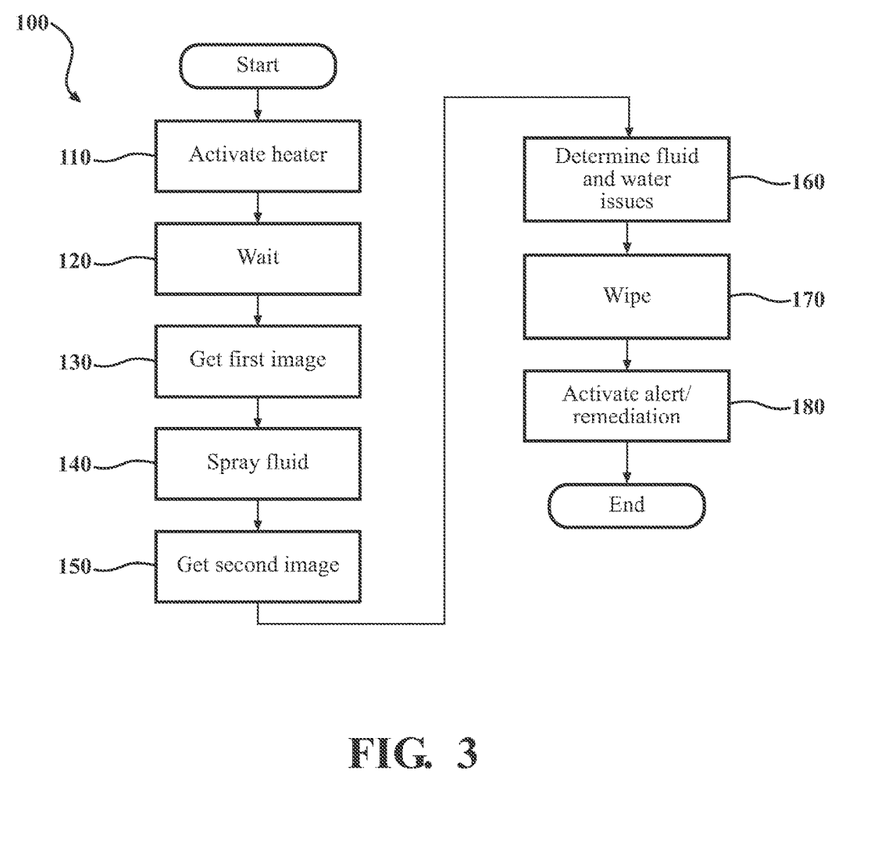
FIG. 3 is a flowchart illustrating an example process of operating a windshield cleaning system.

A process 100 of operating the windshield cleaning system 20 is shown in FIG. 3. The process 100 begins when the computer 30 is instructed, or determines, to perform the process 100. For example, an instruction to begin the process 100 may be received by the computer from an input device such as a switch or a button to initiate the process 100. More typically, the computer 30 will be programmed to initiate the process 100 upon receiving user input to spray fluid 65 on the windshield 23, and/or upon determining to spray fluid 65 on the windshield 23 without user input, e.g., upon a determination via an imaging device or the like that the windshield 23 requires cleaning and/or clearing. It is also possible that the process 100 could be initiated when windshield wipers 45 are activated and/or periodically, e.g., once every three minutes, once every five minutes, etc., after the wipers 45 are actuated. Accordingly, the computer 30 may determine the process 100 is to be performed based on input and analysis of information from other sensors such as the image device 50, a temperature sensor, a time indicating device, etc.

Beginning the process at a block 110, the computer 30 actuates the fluid heater 70 to heat the fluid 65 in the windshield fluid applicator 60. The computer 30 may determine to actuate the fluid heater 70 if the ambient temperature in an environment surrounding the vehicle is below a predetermined temperature threshold, e.g., freezing or a temperature slightly above freezing, e.g., two degrees centigrade. The computer 30 may identify the ambient temperature based on an electrical signal received from one or more input device 36 such as a temperature sensor.

Next, at a block 120, after the fluid heater 70 has been actuated, the computer 30 waits a predetermined minimum amount of time, e.g., 5 seconds, before proceeding to the block 140. Waiting the predetermined amount of time allows the heater 70 sufficient time to accumulate heat energy to warm the sprayed fluid 65. The predetermined wait time may be a fixed amount of time, or it may be determined by the computer 30. For example, various ambient temperatures may be associated with various wait times in a table or the like stored in the memory 34 of the computer 30, with lower temperatures associated with longer wait times.

Figure 4:
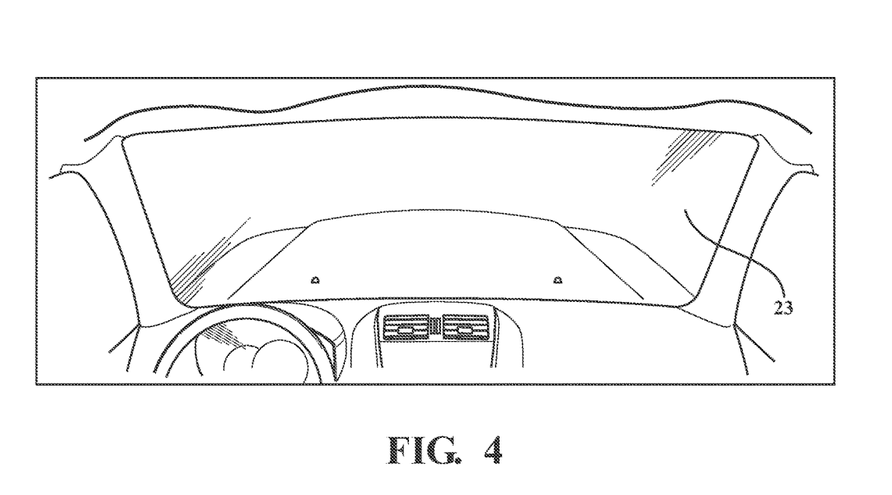
FIG. 4 is an illustration of a pre-spray image captured by an image device.
Figure 5:
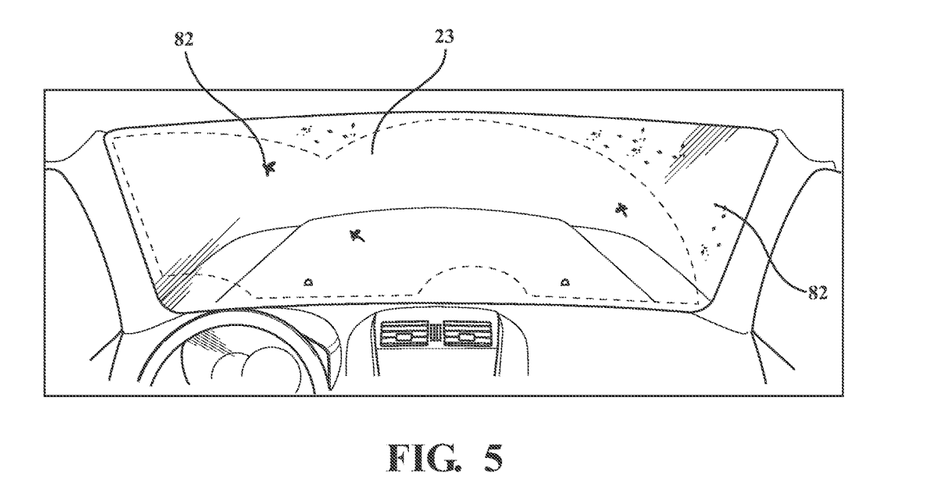
FIG. 5 is an illustration of another pre-spray image captured by the image device.

Next, at a block 130, the computer 30 instructs one or more imaging devices 50 to capture a first, i.e., pre-spray, image of the windshield 23. The pre-spray image differs from a stored baseline image in that the pre-spray image is acquired each time the process 100 is executed, providing a more accurate image for comparison analysis, as further described below. The stored baseline image could be an image stored at the time of vehicle manufacture, based on predetermined conditions applied to a vehicle of a same make and model, etc. For example, compare the pre-spray images illustrated in FIG. 4 and FIG. 5. Using the image illustrated in FIG. 4 could produce different analysis results if the actual condition of the windshield includes dirt 82, as shown in FIG. 5. The computer 30 acquires the image when the image is sent by the image device 50 and received by the computer 30 where it is stored in memory 34. The pre-spray image is acquired by the computer 30 before block 140 is executed.

Next, at a block 140, after the pre-spray image is acquired by the computer 30, the computer 30 actuates the windshield fluid applicator 60, e.g., to operate its pump and spray fluid 65 from the nozzles 63 towards the windshield 23.

Next, at a block 150, after the windshield fluid applicator 60 has been actuated, the computer instructs the image device 50 to capture a second, i.e., post-spray, image of the windshield 23. The computer 30 acquires the second image, and stores it in the memory 34, when the image is provided, e.g., via vehicle 25 wired or wireless communications, from the image device 50. The post-spray image is acquired by e computer 30 before a block 160 and a block 170 are executed.

Next, in the block 160, after the post-spray image has been acquired, the computer 30 analyzes the pre-spray image and post-spray image in relation to each other to identify one or more windshield cleaning conditions that may exist with the windshield cleaning system 20. A windshield cleaning condition of the windshield cleaning system 20 is defined herein as a detection or determination by the computer 30 that at least an expected outcome of a properly functioning windshield cleaning system 20 has not occurred. For example, where the fluid spray applicator 60 is expected to distribute fluid spray 65 on the windshield, a condition is identified by the computer 30 when an insufficient amount of spray has been applied, possibly resulting from a frozen or clogged nozzle, a disconnected hose in the fluid applicator, an insufficient amount of fluid in a fluid reservoir, a faulty fluid pump, etc. In another example, where heated fluid spray 65 is expected to increase the temperature of the windshield, a condition is identified by the computer 30 when there is insufficient change in temperature after spraying heated fluid 65, as discussed below.

To analyze the images obtained in the blocks 130 and 150, the computer 30 uses known image processing techniques to subtract one image from another, then creates and stores a third, image, i.e., a fluid spray image, that consists substantially of only the differences between the pre-spray and post-spray images. Various characteristics of the third image can be compared to condition table or the like stored in the computer 30 memory 34 that associates the image characteristics with one or more conditions.

Figure 6:
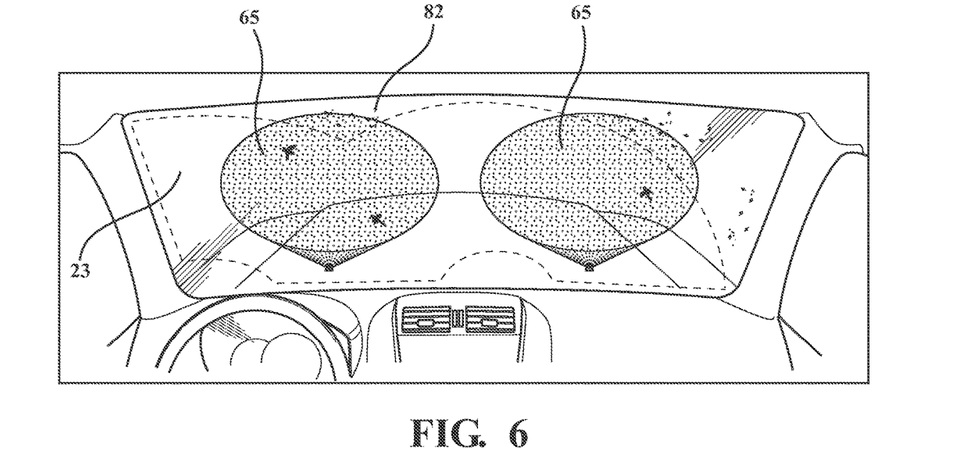
FIG. 6 is an illustration of a post-spray image captured by the image device.
Figure 7:
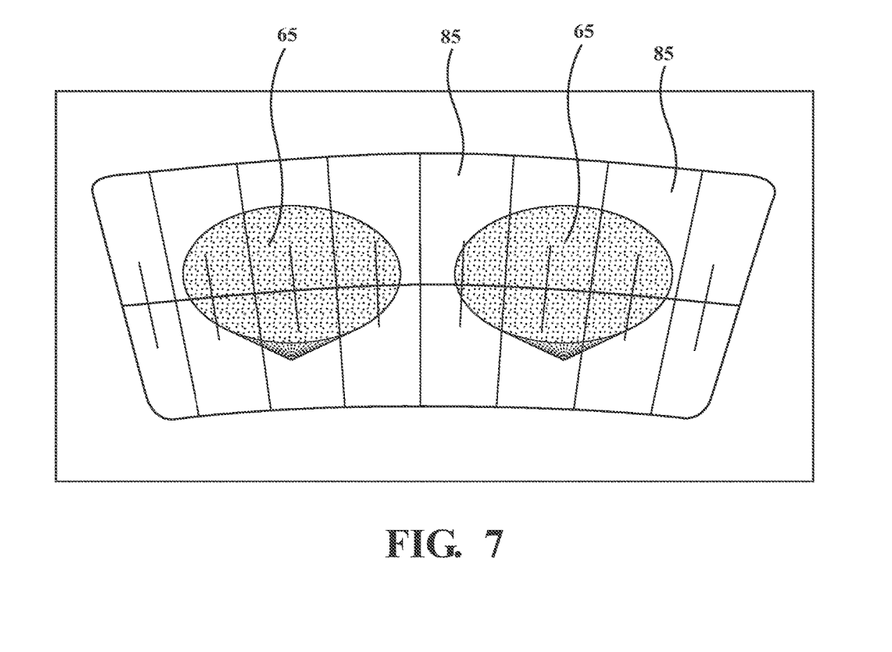
FIG. 7 is an illustration of a fluid spray image showing a difference analysis between two images.

Exemplary illustrations of pre-spray and post spray images are shown in FIGS. 5 and 6, respectively. Executing of a subtraction algorithm applied to these images in the computer 30 results in a created spray image illustrated in FIG. 7 showing the differences between the images, i.e. the sprayed fluid 65. In the subtraction process common elements, such as dirt 82, have been removed.

With continued reference to FIG. 7, the identified sprayed fluid 65 can be analyzed based on characteristics such as the area, density, location, and perimeter of the sprayed fluid 65. The analysis may utilize individual quadrants 85 to perform sub-analysis and/or comparison with predetermined threshold limits.

Figure 8:
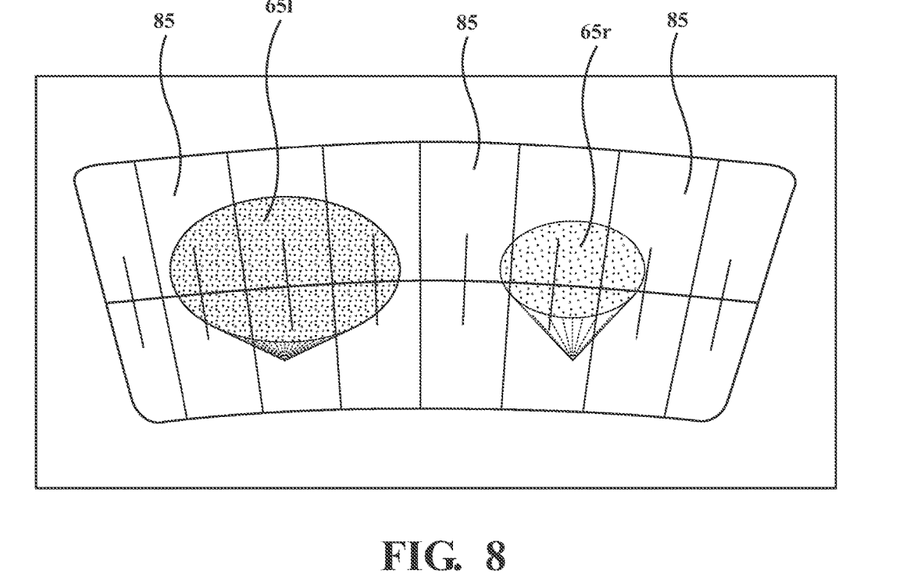
FIG. 8 is an illustration of another fluid spray image showing a difference analysis between another two images.

For example, an image comparison illustrated in FIG. 8 shows a right sprayed fluid 65r pattern that is different than a left sprayed fluid 65l pattern. The computer 30 may identify a characteristic, such as a discrepancy in size between the sprayed fluid 65r 65l patterns or the area of the right sprayed fluid 65r pattern being below a threshold limit. The identified characteristic is then compared by the computer 30 to the condition table to identify the associated condition, in this example a partially blocked nozzle 63 on the left side.

Figure 9:
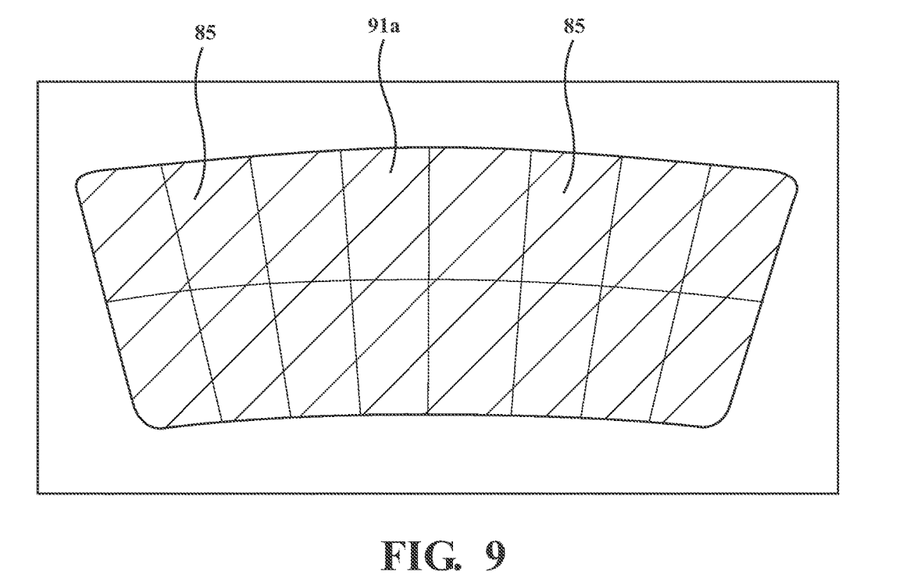
FIG. 9 is an illustration of an infrared pre-spray image captured by the image device.
Figure 10:
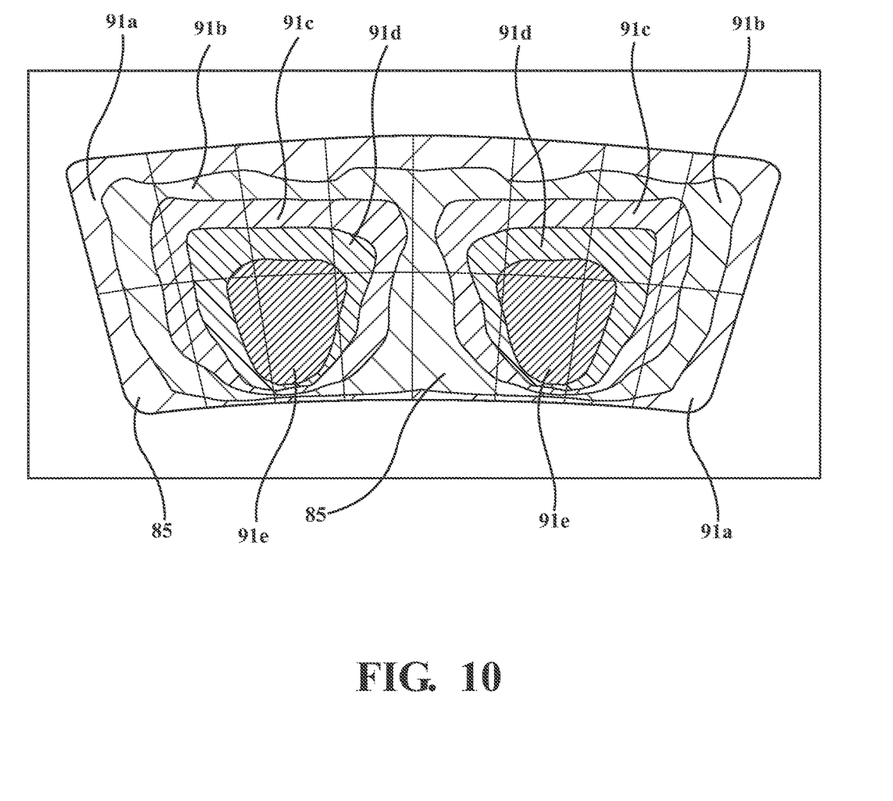
FIG. 10 in an illustration of an infrared post-spray image captured by the image device.

With reference now to FIGS. 9 and 10, illustrations of infrared pre-spray and post-spray images are shown, respectively. Known infrared image capture techniques produce images which include different color areas 91a-e in which different colors are associated with different temperatures. In the black-and-white drawing, different colors, e.g. infrared wavelengths, are indicated by respective cross hatch patterns.

The infrared pre-spray image illustrated in FIG. 9 shows a windshield that has a uniform color 91a associated with the windshield at an ambient temperature. It is to be understood that the windshield will not always have a uniform pre-spray temperature, as externalities such as a defrost system of the vehicle may affect the temperature of the windshield in discreet locations.

The infrared post-spray image illustrated in FIG. 10 shows concentrations of color areas 91e indicative of an area of the windshield 23 that has undergone the greatest temperature increase as a result of being sprayed with heated fluid. The temperature of the windshield 23 decreases the as the distance away from the heated spray increases, as indicated by color areas 91d-91b, each color area associated with a different range of temperatures. Edges of the windshield unaffected by the heated spray remain at the ambient temperature as indicated by color area 91a.

The computer 30 analyzes the infrared images by comparing the various colors of the images with a temperature table or the like associating the color with a temperature. The computer 30 then determines the temperature change between pre-spray and post-spray infrared images. The temperature change may be determined based on an average temperature, an absolute maximum or minimum temperature, and/or a local maximum or minimum temperature represented in an infrared image. The temperature change analysis may be performed for respective quadrants 85 of the windshield 23, as discussed above.

Based on the pre-spray and post-spray infrared images, the computer 30 may identify that a temperature change between the images is below a predetermined threshold, and utilize the temperature change and condition table to determine that a condition exists with the fluid heater 70, such as the fluid heater 70 not adequately heating the fluid 65.

Continuing with the process 100, in the block 170 after the post-spray image has been acquired, the computer 30 instructs the windshield wiper controller 40 to actuate the wipers 45 to wipe the fluid 65 from the windshield 23.

Next, in a block 180, after one or more condition(s) that may exist with the windshield cleaning system 20 have been identified by the computer 30, the computer 30 actuates one or more remediation mechanisms and/or outputs a notification about the condition(s). For example, heating a frozen nozzle 63, e.g., clogged by ice, could allow fluid 65 to be freely dispensed and to thereby clean the windshield 23. In further example, the computer 30 may actuate the windshield defroster 80 to heat the windshield 23 when a condition is identified with the fluid heater 70. Additionally, the computer 30 could re-execute the process 100 to determine whether the conditions detected upon prior applications of the fluid 65, have been resolved. For example, repeated actuation of the fluid applicator 60 could unblock a clogged nozzle 63. Where such conditions are not resolved, the computer 30 could take certain steps, such as pulling the vehicle 25 to a roadside and/or suspending driving operations until the problem can be addressed. In the case of an automated vehicle, the remediation could involve the computer 30 to instruct the vehicle to drive a service location where the condition may be further examined and remediated.

A notification may be sent to one or more output devices such as a GUI of the vehicle 25, a user device such as a smartphone or the like, etc. The notification may take the form of a visual or audible signal to be received by a user of the vehicle such as a warning to repair a fluid heater when a spray temperature difference between the first and second inferred images is below a predetermined temperature difference threshold. In further examples, the computer 30 may cause a light to be illuminated on a dashboard of a vehicle, a message to be displayed on a GUI of the vehicle 25, a message to be spoken on an audio system of the vehicle, etc., The notification may take the form of an electronic signal sent to another computer of the vehicle 25, or another computer independent of the vehicle. The another computer could include a computer associated with a service station to further examine and remediate the condition. The electronic signal may be sent wired or wirelessly, using known techniques such as Bluetooth, Wi-Fi, cellular etc.

CONCLUSION

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 100, one or more of the steps could be omitted, or the steps could be executed in a different order. In other words, the descriptions of systems and/or processes herein are provided for the purpose of illustrating certain embodiments, and should in no way be construed so as to limit the disclosed subject matter, unless such order is explicitly described in the claims.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
   acquire a first infrared image of a windshield;
   after acquiring the first infrared image, cause fluid to be sprayed onto the windshield;
   acquire a second infrared image of the windshield after the fluid is sprayed onto the windshield and before causing wipers to wipe the windshield;
   generate a third image by subtracting the first infrared image from the second infrared image, the third image indicating a change in temperature of the windshield;
   identify a windshield cleaning condition based at least in part on the third image; and
   actuate an output device based on the identified windshield cleaning condition.

2. The system of claim 1, wherein the instructions further include instructions to cause the wipers to wipe the windshield after capturing the second image.

3. The system of claim 1, wherein the output device is a fluid heater, and the instructions further include instructions to actuate the fluid heater before spraying the fluid when an ambient temperature is below a predetermined temperature threshold.

4. The system of claim 1, wherein the output device is a human machine interface (HMI), and the instructions further include instructions to actuate the HMI to provide a warning to repair a fluid heater when the change in temperature indicated by the third image is below a predetermined temperature difference threshold.

5. The system of claim 3, wherein the instructions further include instructions to wait a predetermined amount of time before spraying the fluid after actuating the fluid heater.

6. The system of claim 1, wherein the windshield cleaning condition is identified by analysis of quadrants of the third image.

7. The system of claim 6, wherein the windshield cleaning condition is a condition of a specific nozzle.

8. The system of claim 1, wherein the windshield cleaning condition is identified by a total area of the third image being less than a predetermined threshold amount of area.

9. The system of claim 1, wherein the output device is a vehicle in which the computer is installed; and
   the instructions further comprise:
   upon identification of windshield cleaning condition, instructing the vehicle to drive to a service station.

10. A vehicle assembly comprising:
   a windshield;
   a fluid applicator configured to spray fluid on the windshield;
   an image device configured to capture an infrared image of the windshield;
   a computer in communication with the fluid applicator and the image device, the computer including a processor and a memory, the memory storing instructions executable by the computer to:
   acquire a first infrared image of the windshield;
   actuate the fluid applicator to spray the fluid onto the windshield;
   acquire a second infrared image of the windshield after actuating the fluid applicator and before causing wipers to wipe the windshield;

generate a third image by subtracting the first infrared image from the second infrared image, the third image indicating a change in temperature of the windshield;

identify a windshield cleaning condition based at least in part on the third image; and actuate an output device based on the identified windshield cleaning condition.

11. The vehicle assembly of claim 10, further comprising:
a windshield wiper controller in communication with the computer and configured to wipe the windshield; and
the instructions stored in the memory of the computer further comprising instructions executable by the computer to:
actuate the windshield wiper controller to wipe the windshield after the second infrared image has been captured.

12. The vehicle assembly of claim 10, further comprising:
a fluid heater in communication with the computer and configured to heat the fluid; and
the instructions stored in the memory of the computer further comprising instructions executable by the computer to:
actuate the fluid heater; and
wait a predetermined amount of time after actuating the fluid heater before actuating the fluid applicator to spray the fluid onto the windshield.

13. The vehicle assembly of claim 10, wherein the windshield cleaning condition is a condition of a fluid heater as identified by the change in temperature indicated by the third image being below a predetermined temperature difference threshold.

14. The vehicle assembly of claim 10, wherein the windshield cleaning condition is identified by analysis of individual quadrants of the third image.

15. The vehicle assembly of claim 10, wherein the windshield cleaning condition is identified by a total area of the fluid spray identified with the third image being less than a predetermined threshold amount of area.

16. The vehicle assembly of claim 10, further comprising:
the fluid applicator having a plurality of nozzles; and
wherein the windshield cleaning condition is a condition of one of the plurality of nozzles.

17. A method comprising:
acquiring a first infrared image of a windshield;
actuating a fluid applicator to spray a fluid onto the windshield;
acquiring a second infrared image of the windshield after actuating the fluid applicator and before causing wipers to wipe the windshield;
generating a third image by subtracting the first infrared image from the second infrared image, the third image indicating a change in temperature of the windshield;
identifying a windshield cleaning condition based at least in part on the third image; and
actuating an output device based on the identified windshield cleaning condition.

18. The method of claim 17 further comprising:
actuating a fluid heater before actuating the fluid applicator when an ambient temperature is below a predetermined temperature threshold.

19. The method of claim 17 further comprising:
actuating the wipers to wipe the windshield after capturing the second infrared image.

* * * * *